US008885186B2

(12) United States Patent
Matsuda (10) Patent No.: US 8,885,186 B2
(45) Date of Patent: Nov. 11, 2014

(54) PRINTER USING A CONVERSION SERVER TO PERFORM PRINTING (75) Inventor: Munehisa Matsuda, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 133 days.

(21) Appl. No.: 13/619,582

(22) Filed: Sep. 14, 2012

(65) Prior Publication Data

US 2013/0163017 A1    Jun. 27, 2013

(30) Foreign Application Priority Data

Dec. 22, 2011  (JP) ................................ 2011-281086

(51) Int. Cl.
*G06F 3/12* (2006.01)
(52) U.S. Cl.
USPC ....... 358/1.13; 358/1.15; 358/1.14; 358/1.16; 709/203
(58) Field of Classification Search
None
See application file for complete search history.

(56) References Cited

U.S. PATENT DOCUMENTS

| | | | | |
|---|---|---|---|---|
| 7,173,728 | B2* | 2/2007 | Suzuki et al. ................. | 358/1.15 |
| 8,319,988 | B2* | 11/2012 | Ferlitsch ....................... | 358/1.15 |
| 8,472,057 | B2* | 6/2013 | Nagashima ................... | 358/1.15 |
| 2011/0149333 | A1* | 6/2011 | Hong ............................. | 358/1.15 |
| 2012/0102548 | A1* | 4/2012 | Tamura .............................. | 726/4 |

FOREIGN PATENT DOCUMENTS

| | | |
|---|---|---|
| JP | H11-024857 A | 1/1999 |
| JP | H11-119929 A | 4/1999 |
| JP | 2000-284926 A | 10/2000 |

* cited by examiner

*Primary Examiner* — Paul F Payer (74) *Attorney, Agent, or Firm* — Merchant & Gould PC (57) ABSTRACT

A printer includes: a receiving unit for receiving a first print notification from a notification server; a transmitting unit for transmitting a first conversion instruction including a first target location information representing a location for specifying the target print data to a conversion server when the first print notification is received from the notification server, wherein the first conversion instruction is for controlling the conversion server to obtain the target print data using the first target location information and to convert the target print data; a print data obtaining unit for obtaining converted print data having a format that can be interpreted by the printer from the conversion server when the conversion server generates the converted print data in accordance with the first conversion instruction; and a print control unit for controlling a print performing unit to perform printing in accordance with the converted print data.

10 Claims, 8 Drawing Sheets

FIG. 1

FIG. 4 (FIRST EXEMPLARY EMBODIMENT)

FIG. 7
(THIRD EXEMPLARY EMBODIMENT)

PRINTER USING A CONVERSION SERVER TO PERFORM PRINTING

CROSS-REFERENCE TO RELATED APPLICATIONS

This application claims priority from Japanese Patent Application No. 2011-281086 filed on Dec. 22, 2011, the entire subject matter of which is incorporated herein by reference.

TECHNICAL FIELD

The invention relates to a printer configured to communicate with a notification server and a conversion server.

BACKGROUND

There have been proposed a system having a file server and a plurality of printers. The file server stores print data to be printed in the printers. When receiving a print request from a specific printer of the plurality of printers, the file server converts print data, generates a PDL file having a format which the specific printer can interpret, and transmits the PDL file to the specific printer.

SUMMARY

Illustrative aspects of the invention provide a technology capable of appropriately using a conversion server to perform printing when a printer receives a print notification from a notification server.

According to one illustrative aspect of the invention, there is provided a printer comprising: a processor; and a memory having a computer program stored thereon that, when executed by the processor, causes the printer to operate as: a receiving unit; a transmitting unit; a print data obtaining unit; and a print control unit. The receiving unit is configured to receive a first print notification from a notification server, wherein the first print notification is transmitted from the notification server to the printer when a first print instruction for instructing printing of an image represented by target print data is supplied from a terminal device to the notification server. The transmitting unit is configured to transmit a first conversion instruction including a first target location information representing a location for specifying the target print data to a conversion server when the first print notification is received from the notification server, wherein the first conversion instruction is for controlling the conversion server to obtain the target print data using the first target location information and to convert the target print data. The print data obtaining unit is configured to obtain converted print data having a format that can be interpreted by the printer from the conversion server when the conversion server generates the converted print data in accordance with the first conversion instruction. The print control unit is configured to control a print performing unit to perform printing in accordance with the converted print data.

DETAILED DESCRIPTION

General Overview

According to a first illustrative aspect of the invention, there is provided a printer comprising: a processor; and a memory having a computer program stored thereon that, when executed by the processor, causes the printer to operate as: a receiving unit; a transmitting unit; a print data obtaining unit; and a print control unit. The receiving unit is configured to receive a first print notification from a notification server, wherein the first print notification is transmitted from the notification server to the printer when a first print instruction for instructing printing of an image represented by target print data is supplied from a terminal device to the notification server. The transmitting unit is configured to transmit a first conversion instruction including a first target location information representing a location for specifying the target print data to a conversion server when the first print notification is received from the notification server, wherein the first conversion instruction is for controlling the conversion server to obtain the target print data using the first target location information and to convert the target print data. The print data obtaining unit is configured to obtain converted print data having a format that can be interpreted by the printer from the conversion server when the conversion server generates the converted print data in accordance with the first conversion instruction. The print control unit is configured to control a print performing unit to perform printing in accordance with the converted print data.

For example, it may be considered a configuration in which the printer obtains target print data and supplies the target print data to the conversion server (hereinafter, referred to as a comparative example). However, in the comparative example, the printer needs to obtain and supply target print data, so that the process load of the printer is high. In contrast, according to the illustrative aspects of the invention, when the printer receives the first print notification from the notification server, the printer transmits the first conversion instruction including the first target location information to the conversion server, so as to enable the conversion server to obtain and convert the target print data. As a result, the printer can obtain the converted print data from the conversion server and perform printing. Therefore, the printer completes the printing without obtaining the target print data and without supplying the target print data to the conversion server. For this reason, it is possible to reduce the process load of the printer, as compared to the comparative example. In other words, in a case of receiving the first print notification from the notification server, the printer can appropriately use the conversion server to perform printing.

According to a second illustrative aspect of the invention, the computer program that, when executed by the processor, causes the printer to further operate as: a first-location-information obtaining unit configured to obtain the first target location information from the notification server when the first print notification is received from the notification server. The transmitting unit is configured to transmit the first conversion instruction including the obtained first target location information to the conversion server.

According to this configuration, the printer can appropriately transmit the first conversion instruction including the first target location information to the conversion server.

According to a third illustrative aspect of the invention, the computer program that, when executed by the processor, causes the printer to further operate as: a second-location-information obtaining unit configured to obtain specific location information representing a location for specifying the converted print data from the conversion server. The print data obtaining unit is configured to obtain the converted print data from the conversion server using the obtained specific location information.

According to this configuration, the printer can appropriately obtain the converted print data from the conversion server.

According to a fourth illustrative aspect of the invention, the computer program that, when executed by the processor, causes the printer to further operate as: a storage control unit configured to store authentication information for obtaining the target print data in a storage unit. When the first print notification is received from the notification server, the transmitting unit is configured to transmit the first conversion instruction including the authentication information stored in the storage unit, to the conversion server. The first conversion instruction is for controlling the conversion server to obtain the target print data using the authentication information.

According to this configuration, the printer can appropriately make the conversion server obtain the target print data.

According to a fifth illustrative aspect of the invention, when the status of printer is a first status where the printer is able to perform printing, the transmitting unit is configured to transmit the first conversion instruction to the conversion server. When the status of printer is a second status where the printer is unable to perform printing, the transmitting unit is configured not to transmit the first conversion instruction to the conversion server until the status of printer changes to the first status, and the transmitting unit is configured to transmit the first conversion instruction to the conversion server after the status of printer changes to the first status.

According to this configuration, the printer can make the conversion server obtain and convert the target print data at an appropriate timing.

According to a sixth illustrative aspect of the invention, in a specific case where it is unable to obtain the converted print data from the conversion server after the first conversion instruction is transmitted to the conversion server, the transmitting unit is configured to transmit a second conversion instruction including second target location information representing a location for specifying the target print data to the conversion server. The second conversion instruction is for controlling the conversion server to obtain the target print data using the second target location information and to convert the target print data. When the conversion server generates the converted print data in accordance with the second conversion instruction, the print data obtaining unit is configured to obtain the converted print data from the conversion server, and the print control unit is configured to control the print performing unit to perform printing in accordance with the converted print data.

According to this configuration, if the printer is unable to obtain the converted print data from the conversion server even after transmitting the first conversion instruction to the conversion server, the printer transmits the second conversion instruction to the conversion server. Therefore, even in the specific case, the printer can appropriately obtain the converted print data from the conversion server.

According to a seventh illustrative aspect of the invention, the computer program that, when executed by the processor, causes the printer to further operate as: a supply unit configured to supply a second print instruction for instructing printing of the image represented by the target print data to the notification server in the specific case. The second print instruction is for controlling the notification server to transmit a second print instruction to the printer. The receiving unit is configured to receive the second print instruction from the notification server in the specific case. The transmitting unit is configured to transmit the second conversion instruction including the second target location information to the conversion server when the second print notification is received from the notification server.

According to this configuration, in the specific case, the printer supplies the second conversion instruction to the notification server, so that the printer is able to receive the second print notification from the notification server. Therefore, the printer can appropriately transmit the second conversion instruction to the conversion server in response to the second print notification, and appropriately obtain the converted print data from the conversion server in response to the second conversion instruction.

According to an eighth illustrative aspect of the invention, in the specific case, the print data obtaining unit is configured to obtain the target print data using the first target location information, and the supply unit is configured to transmit the second print instruction including the target print data to the notification server.

According to this configuration, in the specific case, the printer can appropriately transmit the second conversion instruction including the target print data to the conversion server.

According to a ninth illustrative aspect of the invention, the computer program that, when executed by the processor, causes the printer to further operate as: a supply unit configured to supply a third print instruction for instructing printing of the image represented by the target print data to the notification server in a specific case where it is unable to obtain the converted print data from the conversion server after the first conversion instruction is transmitted to the conversion server. The third print instruction is for controlling the notification server to transmit a third print notification to the conversion server. The third print notification is for controlling the conversion server to obtain the target print data. The transmitting unit is configured to transmit a specific instruction to the conversion server in the specific case. The specific instruction is for controlling the conversion server to convert the target print data. When the conversion server generates the converted print data in accordance with the specific instruction, the print data obtaining unit is configured to obtain the converted print data from the conversion server, and the print control unit is configured to control the print performing unit to perform printing in accordance with the converted print data.

According to this configuration, in the specific case, the printer transmits the third print instruction to the notification server and transmits the specific instruction to the conversion server. As a result, the conversion server obtains and converts the target print data. Therefore, even in the specific case, the printer can appropriately obtain the converted print data from the conversion server.

According to a tenth illustrative aspect of the invention, the computer program that, when executed by the processor, causes the printer to further operate as: a determining unit configured to determine whether the printer is able to interpret the target print data when the first print notification is received from the notification server. When the determining unit determines that the printer is unable to interpret the target print data, the transmitting unit is configured to transmit the first conversion instruction to the conversion server, the print data obtaining unit is configured to obtain the converted print data from the conversion server, and the print control unit is configured to control the print performing unit to perform printing in accordance with the converted print data. When the determining unit determines that the printer is able to interpret the target print data, the transmitting unit is configured not to transmit the first conversion instruction to the conversion server, the print data obtaining unit is configured to obtain the target print data using the first target location information, and the print control unit is configured to control the print performing unit to perform printing in accordance with the target print data.

According to this configuration, the printer can appropriately perform printing according to whether the printer can interpret the target print data.

Further, control methods and computer programs for implementing the above-described printer, and non-transitory computer-readable medium having the corresponding computer programs stored thereon are also novel and useful.

EXEMPLARY EMBODIMENTS

Exemplary embodiments of the invention will now be described with reference to the drawings.

First Exemplary Embodiment (Configuration of System)

Figure 1:
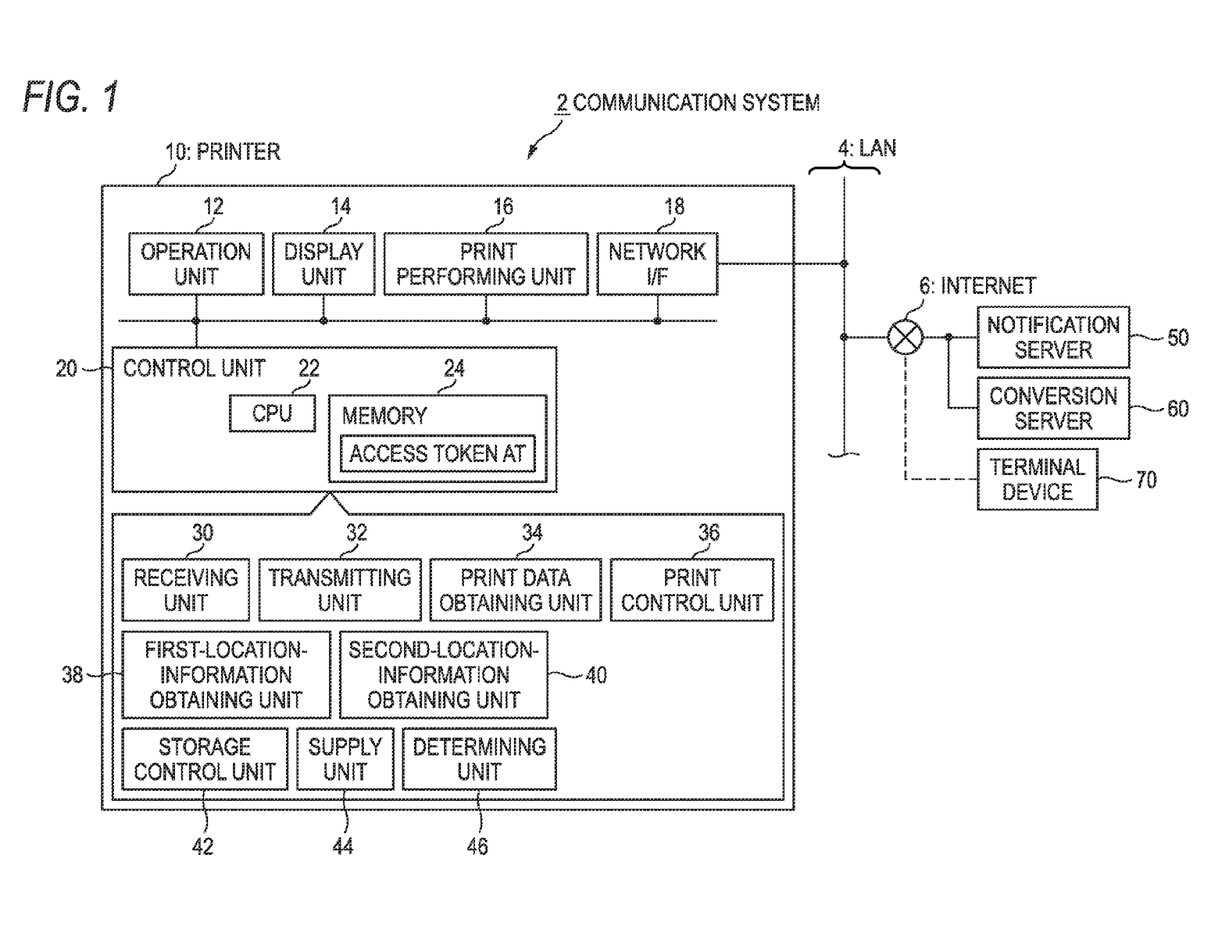
FIG. 1 shows an example of a configuration of a communication system.

As shown in FIG. 1, a communication system 2 includes a printer 10, a notification server 50, a conversion server 60, and a terminal device 70. The printer 10 is connected to the Internet 6 through a LAN 4. The notification server 50 and the conversion server 60 are connected to the Internet 6. Therefore, the printer 10 is connected in communication with the notification server 50 and the conversion server 60 through the LAN 4 and the Internet 6. The terminal device 70 is a known communication terminal device such as a desktop type PC, a laptop type PC, a tablet PC, a mobile phone, smartphone, or a PDA terminal. When a user of the terminal device 70 operates the terminal device 70 for connecting the terminal device 70 to the Internet 6, the terminal device 70 is connected in communication with the Internet 6. In this case, the terminal device 70 is connected in communication with the notification server 50 through the Internet 6.

(Configuration of Printer 10)

The printer 10 includes an operation unit 12, a display unit 14, a print performing unit 16, a network interface 18, and a control unit 20. These units 12 to 20 are connected to a bus line (not shown). The operation unit 12 includes a plurality of keys. The user can input a variety of instructions to the printer 10 by operating the operation unit 12. The display unit 14 is configured to display various information. The print performing unit 16 includes a printing mechanism of an inkjet type, a laser type, or the like, and performs printing in accordance with instructions from the control unit 20. The network interface 18 is connected to the LAN 4.

The control unit 20 includes a CPU 22 and a memory 24. The CPU 22 performs various processes in accordance with programs (not shown) stored in the memory 24. The CPU 22 can perform the processes in accordance with the programs, thereby implementing the functions of units 30 to 46. As will be described below in detail, the memory 24 can store an access token AT.

(Configuration of Notification Server 50)

The notification server 50 is provided by a company providing a cloud print service rather than by the vendor of the printer 10. However, in some modifications, the notification server 50 may be provided by the vendor of the printer 10.

When the user of the terminal device 70 wants to use the cloud print service, the user registers account information (such as a user ID and a password) in the notification server 50 in advance. In this case, the notification server 50 uses the account information to generate an access token (hereinafter, referred to simply as an 'AT'). The AT is authentication information necessary for obtaining target print data to be described below. The notification server 50 registers the AT in a memory (not shown) of the notification server 50.

When the AT is generated by the notification server 50, the user of the terminal device 70 performs operation for inputting the AT to the printer 10. For example, the user may input a letter string representing the AT to the operation unit 12 of the printer 10. Also, for example, the user may make the printer 10 and the notification server 50 perform communication such that the printer 10 obtains the AT from the notification server 50. Alternatively, for example, the user may make a relay device such as a PC, the notification server 50, and the printer 10 perform communication such that the relay device obtains the AT from the notification server 50 and then the printer 10 obtains the AT from the relay device. Even if any of the above-described methods is used, the AT can be input to the printer 10. When the AT is input to the printer 10, a storage control unit 42 of the printer 10 stores the AT in the memory 24.

The AT may be regularly updated. For example, the control unit 20 of the printer 10 may request the notification server 50 to generate a new AT at a predetermined update timing. In response to the request from the printer 10, the notification server 50 may generate a new AT and transmit the new AT to the printer 10. In this case, the notification server 50 registers the new AT in place of the old AT in the memory of the notification server 50. Also, the storage control unit 42 of the printer 10 stores the new AT in place of the old AT in the memory 24 of the printer 10. Generally speaking, the authentication information (the AT in this exemplary embodiment) for obtaining target print data to be described below may be permanently usable or be regularly updated.

When the AT is stored in the printer 10 and the notification server 50, the user of the terminal device 70 can make the printer 10 perform printing through the Internet 6 (e.g., the notification server 50) even without installing a device driver for printer 10 in the terminal device 70. In other words, the user can use the cloud print service. Also, in order to make the printer 10 perform printing, the notification server 50 performs some specific processes whose contents will be described below in detail.

(Configuration of Conversion Server 60)

The conversion server 60 is provided by the vendor of the printer 10. However, in some modifications, the conversion server 60 may be a server that is provided by an entity different from the vendor of the printer 10. With respect to each of a plurality of file formats, the conversion server 60 stores a program for converting data having the corresponding file format into data having a predetermined file format. The predetermined file format is a format (for example, a portable document format (PDF)) that the printer 10 is able to interpret.

For example, it is assumed a situation where the user of the terminal device 70 uses the cloud print service to make the printer 10 print a specific image. Hereinafter, data representing the specific image is referred to as 'target print data.' For example, when the file format of target print data is a first file format and the printer 10 is able to interpret the first file format, the printer 10 performs printing in accordance with the target print data without using the conversion server 60. On the other hand, when the file format of target print data is a second file format and the printer 10 is unable to interpret the second file format, for example, the printer 10 converts the target print data and generates corrected print data having the predetermined file format. In this case, the printer 10 performs printing in accordance with the corrected print data. In this manner, in the present exemplary embodiment, since the conversion server 60 is provided, even when the printer 10 is unable to interpret target print data, the printer 10 can appropriately perform printing of the specific image.

(Processes of Printer 10 (FIGS. 2 to 4))

Subsequently, the contents of each of processes performed by the printer 10 will be described with introducing processes performed by the notification server 50, the conversion server 60, and the terminal device 70.

When the user of the terminal device 70 wants to use the cloud print service to make the printer 10 perform printing in accordance with target print data, the user first operates an operation unit (not shown) of the terminal device 70 and connects the terminal device 70 to the notification server 50 through the Internet 6. Next, the user operates the operation unit of the terminal device 70 for selecting the printer 10 to perform printing and target print data TD. The target print data TD may be data stored in the terminal device 70 or may be data stored in another device (for example, a data storing server on the Internet 6) different from the terminal device 70. However, the case where the target print data TD is stored in the terminal device 70 will be described below as an example.

When the above-described operations are performed on the terminal device 70, the terminal device 70 supplies an print instruction PH (see FIG. 3) including the target print data TD to the notification server 50. The print instruction PI1 designates the identification information of the printer 10 (for example, the printer name of the printer 10, the ID address of the printer 10, and the like) as a destination for a print notification to be described below. In other words, the print instruction PH is an instruction for making the notification server 50 transmit a print notification to the printer 10.

When obtaining the print instruction PH from the terminal device 70, the notification server 50 stores the target print data TD of the print instruction PH in a storage unit (not shown) of the notification server 50. In the notification server 50, a unit for performing various communication (for example, acquisition of a print instruction, transmission of a print notification to be described below, and the like) and the storage unit for storing target print data TD may be configured integrally or separately. In other words, the notification server 50 may be only one device or a collection of a plurality of devices. Next, in accordance with the identification information of the printer 10 designated as the destination for a print notification in the print instruction PI1, the notification server 50 transmits a print notification PN1 (see FIG. 3) to the printer 10. The print notification PN1 is a notification for making the printer 10 obtain the target print data TD.

Figure 2:
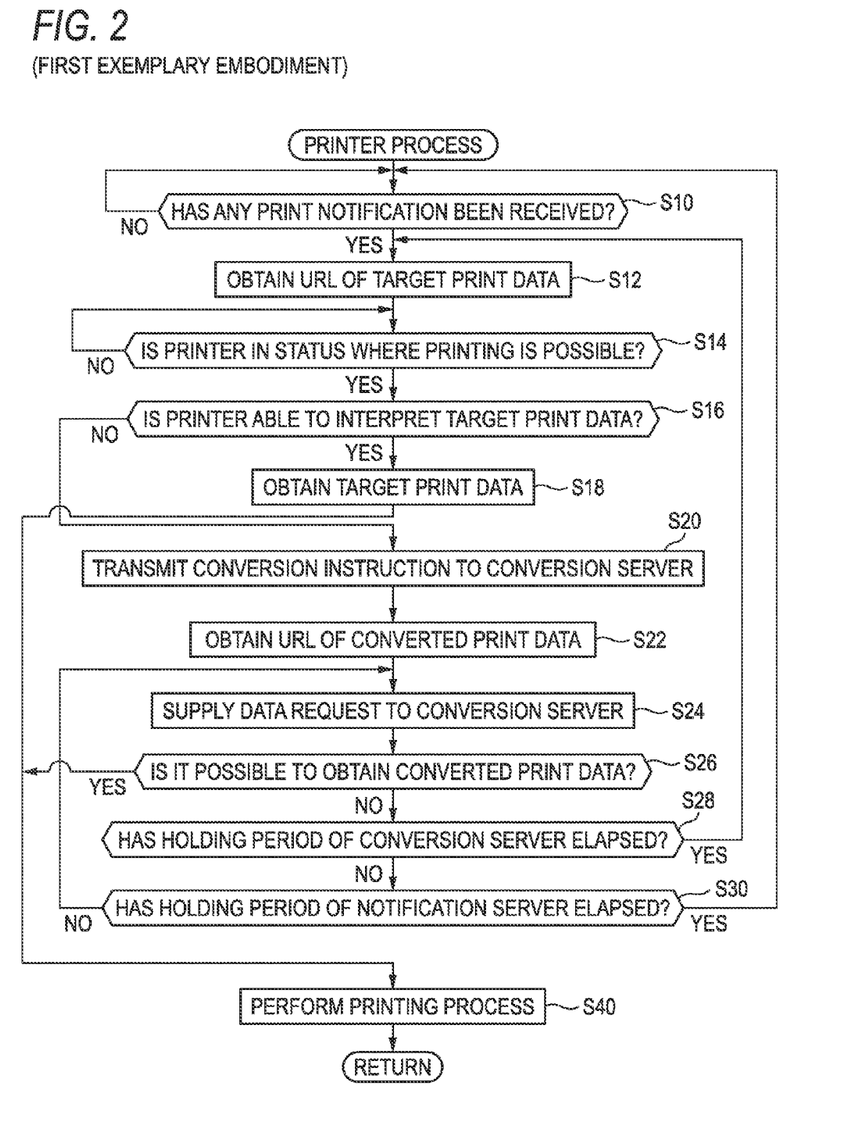
FIG. 2 shows a flow chart illustrating a printer process of a first exemplary embodiment.
Figure 3:
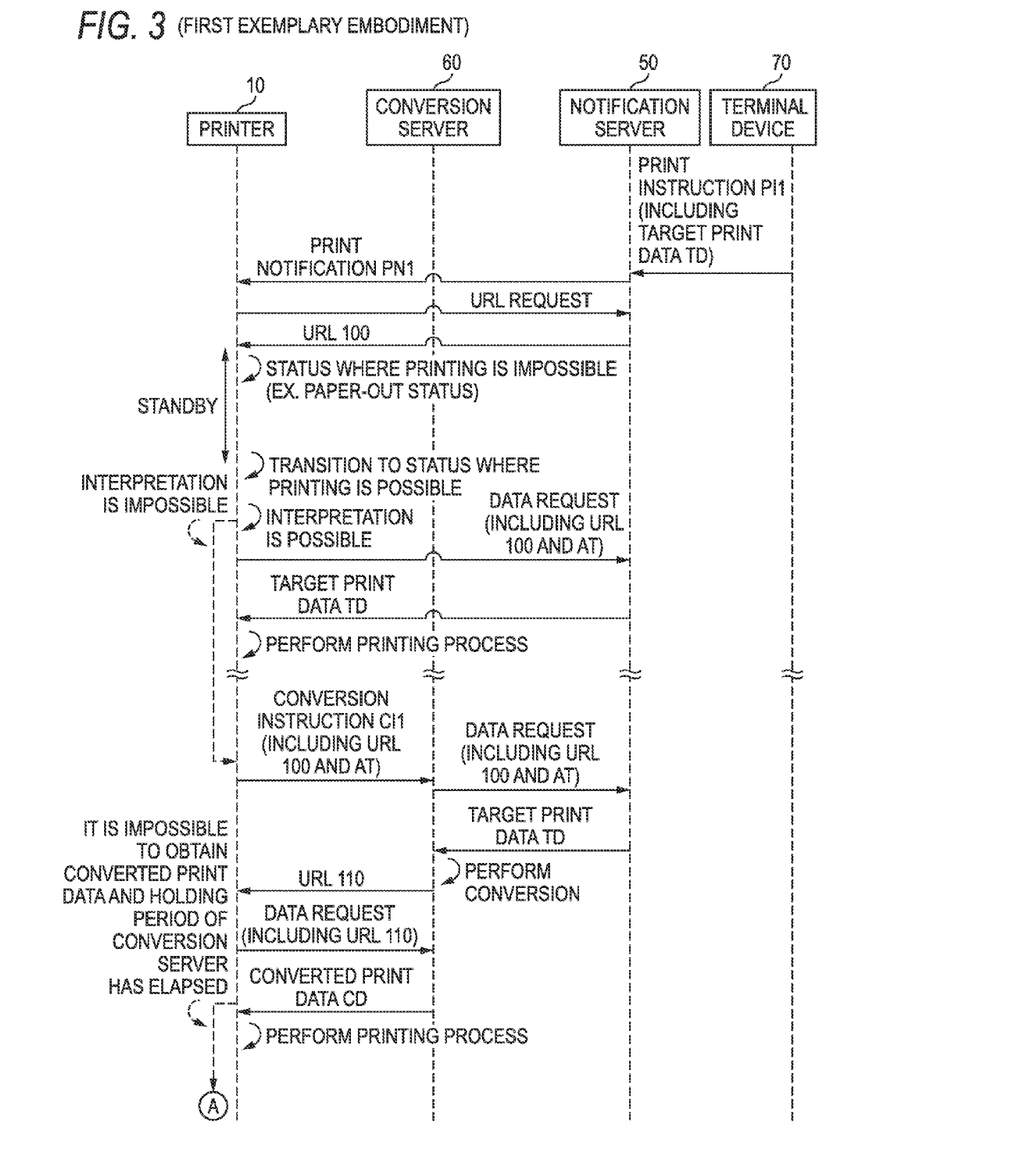
FIG. 3 shows a sequence diagram of processing that is performed by each device according to the first exemplary embodiment.

As shown in STEP S10 of FIG. 2, a receiving unit 30 (see FIG. 1) of the printer 10 monitors whether any print notification has been received from the notification server 50. When receiving the print notification PN1 from the notification server 50, in STEP S10, the determination result becomes 'YES', and the printer process proceeds to STEP S12.

In STEP S12, a first-location-information obtaining unit 38 (see FIG. 1) supplies a uniform resource locator (URL) request to the notification server 50. This URL request is a request for instructing the notification server 50 to supply a URL, representing the storage location of the target print data TD in the storage unit, to the printer 10. In response to the URL request, the notification server 50 supplies a URL 100 (see FIG. 3) of the target print data TD to the printer 10. As a result, in STEP S12, the first-location-information obtaining unit 38 obtains the URL 100 of the target print data TD from the notification server 50.

Next, in STEP S14, the control unit 20 detects the current status of the printer 10. In the present exemplary embodiment, the status of printer 10 can be classified broadly into an error status and a non-error status. The error status is a status in which the printer 10 is unable to perform printing, and includes a status in which the printer is out of paper, a status in which an expendable such as toner or ink has been exhausted, a paper jam status, and the like, for instance. The non-error status is a status in which the printer 10 can perform printing, and includes a status in which printing is being performed, a standby status, and the like.

In STEP S14, the control unit 20 determines whether the current status of the printer 10 is the error status or the non-error status. In a case of determining that the current status of the printer 10 is the non-error status (YES in STEP S14), the printer process proceeds to STEP S16. On the other hand, in a case of determining that the current status of the printer 10 is the error status (NO in STEP S14), the control unit 20 stands by until the status of printer 10 changes to the non-error status. For example, in a paper-out situation, when the user supplies printing sheets to the printer 10, the printer 10 changes from the error status to the non-error status. In this case, the control unit 20 determines that the current status of the printer 10 is the non-error status (YES in STEP S14), and the printer process proceeds to STEP S16.

In STEP S16, a determining unit 46 (see FIG. 1) determines whether the printer 10 is able to interpret the target print data TD. Specifically, the URL 100 obtained in STEP S12 includes the extension of a file of the target print data TD. When the extension included in the URL 100 corresponds to a predetermined interpretable extension, the determining unit 46 determines that the printer is able to interpret the target print data TD (YES in STEP S16). On the other hand, when the extension included in the URL 100 does not correspond to the predetermined interpretable extension, the determining unit 46 determines that the printer is unable to interpret the target print data TD (NO in STEP S16). Alternatively, in some modifications, the determining unit 46 may obtain a file header of the file of the target print data TD from the notification server 50 and perform the determination of STEP S16 on the basis of information (for example, 'MIME TYPE') included in the file header.

When it is determined that the printer 10 is able to interpret the target print data TD (YES in STEP S16), processes of STEPS S20 to S30 to be described below are not performed. In this case, in STEP S18, a print data obtaining unit 34 (see FIG. 1) supplies a data request, including the URL 100 obtained in STEP S12 and the AT stored in the memory 24, to the notification server 50. This data request is a request for instructing the notification server 50 to supply the target print data TD to the printer 10.

When receiving the data request from the printer 10, the notification server 50 performs authentication on the AT included in the data request. Specifically, when the AT included in the data request corresponds to the AT registered in the memory of the notification server 50, the notification server 50 determines that the authentication has succeeded. In this case, the notification server 50 supplies the target print data TD, specified by the URL 100 included in the data request, to the printer 10. As a result, in STEP S18 of FIG. 2, the print data obtaining unit 34 obtains the target print data TD from the notification server 50. When STEP S18 terminates, the printer process proceeds to STEP S40.

On the other hand, when it is determined that the printer 10 is unable to interpret the target print data TD (NO in STEP S16), the process for obtaining the target print data TD from the notification server 50 is not performed, and the processes of STEPS S20 to S30 are performed. In STEP S20, a transmitting unit 32 (see FIG. 1) transmits a conversion instruction CI1 (see FIG. 3), including the URL 100 obtained in STEP S12 and the AT stored in the memory 24, to the conversion server 60. The conversion instruction CI1 is an instruction for making the conversion server 60 obtain the target print data TD using the URL 100 and the AT, and covert the target print data TD.

When receiving the conversion instruction CI1 from the printer 10, the conversion server 60 supplies a data request, including the URL 100 included in the conversion instruction CI1 and the AT included in the conversion instruction CI1, to the notification server 50. As a result, the conversion server 60 obtains the target print data TD from the notification server 50. In this manner, in the present exemplary embodiment, the printer 10 transmits the conversion instruction CI1 including the URL 100 and the AT to the conversion server 60, so as to appropriately enable the conversion server 60 to obtain the target print data TD.

Next, the conversion server 60 converts the target print data TD and generates converted print data CD having the predetermined file format which the printer 10 is able to interpret. Next, the conversion server 60 stores the converted print data CD in the memory of the conversion server 60. Subsequently, the conversion server 60 supplies a URL 110 (see FIG. 3), which represents the storage location of the converted print data CD in the conversion server 60, to the printer 10.

In STEP S22 of FIG. 2, a second-location-information obtaining unit 40 (see FIG. 1) obtains the URL 110 of the converted print data CD from the conversion server 60.

Next, in STEP S24, the print data obtaining unit 34 supplies a data request, including the URL 110 obtained in STEP S22, to the conversion server 60. This data request is a request for instructing the conversion server 60 to supply the converted print data CD to the printer 10. When the current status of the printer 10 is a standby state, the print data obtaining unit 34 supplies the data request to the conversion server 60. In other words, even if the print data obtaining unit 34 obtains the URL 110 from the conversion server 60, when the current status of the printer 10 is a state where printing is being performed or the error status, the print data obtaining unit 34 stands by, without supplying any data request to the conversion server 60, until the status of printer 10 becomes the standby state.

Next, in STEP S26, the print data obtaining unit 34 determines whether it is possible to obtain the converted print data CD from the conversion server 60. Specifically, after the data request is transmitted in STEP S24, before a predetermined period elapses, when the print data obtaining unit 34 obtains the converted print data CD from the conversion server 60, the print data obtaining unit 34 determines that it is possible to obtain the converted print data CD (YES in STEP S26), and the printer process proceeds to STEP S40. On the other hand, after the data request is transmitted in STEP S24, until the predetermined period elapses, when the print data obtaining unit 34 is unable to obtain the converted print data CD from the conversion server 60, the print data obtaining unit 34 determines that it is impossible to obtain the converted print data CD (NO in STEP S26), and the printer process proceeds to STEP S28. For example, when an error occurs in a communication channel between the printer 10 and the conversion server 60, and a case where any problem occurs in the conversion server 60 (for example, cutoff of power of the conversion server 60, an error in the conversion server 60, and the like), it can be determined that it is impossible to obtain the converted print data CD (NO in STEP S26).

When STEP S40 is performed after STEP S18, in STEP S40, a print control unit 36 (see FIG. 1) uses the target print data TD obtained in STEP S18 to generate data (for example, binary data representing ON/OFF of dots) for driving the print performing unit 16. Next, in accordance with the corresponding data, the print control unit 36 drives the print performing unit 16. In other words, the print control unit 36 makes the print performing unit 16 perform printing in accordance with the target print data TD.

On the other hand, in STEP S40, which is performed when the determination result of STEP S26 is 'YES', the print control unit 36 uses the converted print data CD obtained in STEP S26, to generate data for driving the print performing unit 16. Next, in accordance with the corresponding data, the print control unit 36 drives the print performing unit 16. In other words, the print control unit 36 makes the print performing unit 16 perform printing in accordance with the converted print data CD. When STEP S40 terminates, the printer process proceeds to STEP S10.

Incidentally, after the converted print data CD is generated, when the predetermined period elapses, the conversion server 60 erases the converted print data CD from the memory of the conversion server 60. Hereinafter, the predetermined period is referred to as a 'holding period of the conversion server 60.' In STEP S28, the control unit 20 monitors whether the holding period of the conversion server 60 has elapsed. Specifically, when the conversion instruction CI1 is transmitted in STEP S20, a first timer built in the printer 10 starts. When the value of the first timer exceeds a value corresponding to the holding period of the conversion server 60, the control unit 20 determines that it is impossible to obtain converted print data (NO in STEP S26), and determines that the holding period of the conversion server 60 has elapsed (YES in STEP S28). Then, the printer process proceeds to STEP S12. In some modifications, the first timer may not be used. For example, when the holding period of the conversion server 60 elapses, an error notification may be transmitted from the conversion server 60 to the printer 10. In this case, when receiving the error notification from the conversion server 60, the control unit 20 may determine that it is impossible to obtain converted print data (NO in STEP S26) and determine that the holding period of the conversion server 60 has elapsed (YES in STEP S28).

Also, after the target print data TD is stored in the storage unit, when a predetermined period elapses, the notification server 50 erases the target print data TD from the storage unit. Hereinafter, this predetermined period is referred to as a 'holding period of the notification server 50.' In the present exemplary embodiment, the holding period of the notification server 50 is longer than the holding period of the conversion server 60. Therefore, even if the converted print data CD is erased from the memory of the conversion server 60, the target print data TD may remain in the storage unit of the notification server 50. In STEP S30, which is performed when the determination result of STEP S28 is NO, the control unit 20 monitors whether the holding period of the notification server 50 has elapsed. Specifically, when the print notification PN1 is received in STEP S10, a second timer built in the printer 10 starts. When the value of the second timer exceeds a value corresponding to the holding period of the notification server 50, the control unit 20 determines that the holding period of the notification server 50 has elapsed (YES in STEP S30), and the printer process proceeds to STEP S10. In some modifications, the second timer may not be used. For example, when the holding period of the notification server 50 elapses, an error notification may be transmitted from the notification server 50 to the printer 10. In this case, when receiving the error notification from the notification server 50, the control unit 20 may determine that the holding period of the notification server 50 has elapsed (YES in STEP S30).

Figure 4:
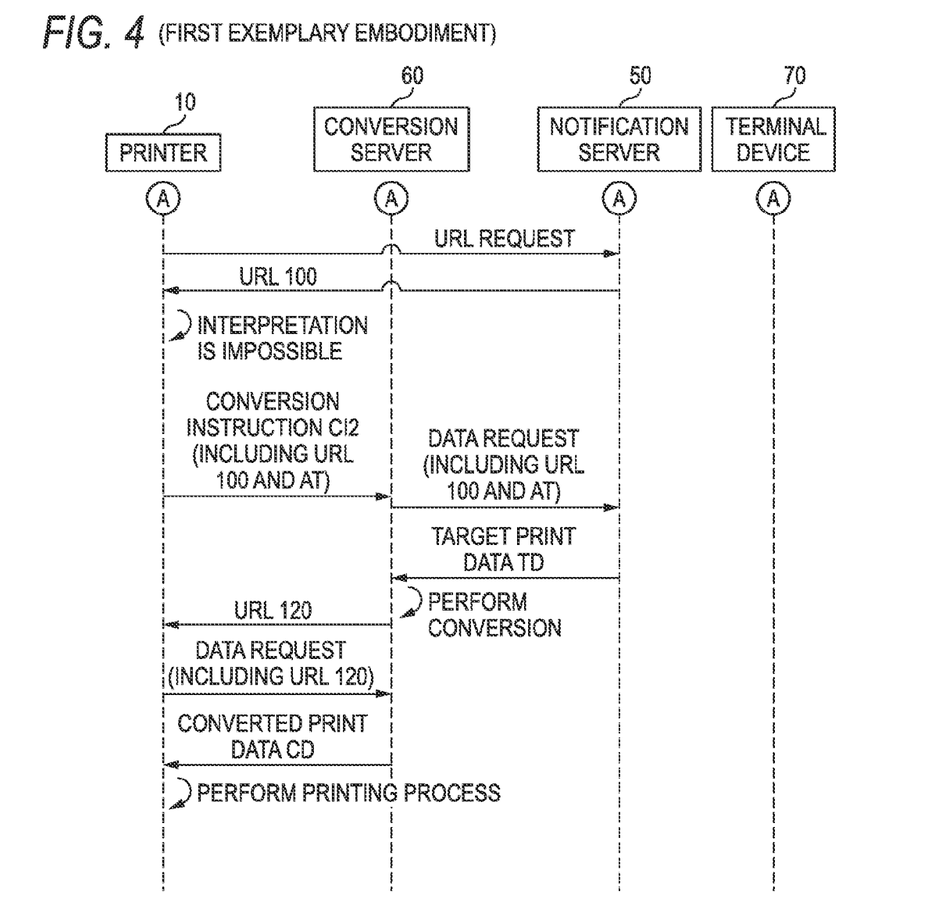
FIG. 4 shows a sequence diagram following FIG. 3.

When the holding period of the conversion server 60 has elapsed (Yes in STEP S28), in STEP S12, the first-location-information obtaining unit 38 supplies the URL request to the notification server 50 again, and obtains the URL 100 again. FIG. 4 shows a sequence when the holding period of the conversion server 60 has elapsed. When the URL 100 is obtained again in STEP S12 of FIG. 2, the determination result of STEP S14 becomes 'YES', and the determination result of STEP S16 becomes 'NO'. Then, in STEP S20, the transmitting unit 32 transmits a conversion instruction CI2 (see FIG. 4) including the URL 100 and the AT to the conversion server 60. As described above, the holding period of the notification server 50 is longer than the holding period of the conversion server 60. Therefore, at the timing when the conversion server 60 receives the conversion instruction CI2 from the printer 10, it is likely that the target print data TD is still hold in the storage unit of the notification server 50. For this reason, the conversion server 60 can obtain the target print data TD from the notification server 50 again. Next, the conversion server 60 generates the converted print data CD again. Therefore, in STEP S22, the second-location-information obtaining unit 40 obtains a URL 120 (see FIG. 4) of the converted print data CD from the conversion server 60. This obtained URL 120 is different from the URL 110 of FIG. 3. The reason is that since the converted print data CD is regenerated, the storage location of the converted print data CD in the conversion server 60 changes.

Next, in STEP S24, the print data obtaining unit 34 supplies a data request including the URL 120 to the conversion server 60. When the converted print data CD is obtained (YES in STEP S26), in STEP S40, the print control unit 36 makes the print performing unit 16 perform printing in accordance with the converted print data CD. In a modification, the printer 10 may store the URL 100 such that when the determination result of STEP S28 is 'YES', the printer process returns to STEP S20. In this modification, when the determination result of STEP S28 is 'YES', in STEP S20, the transmitting unit 32 may transmit a conversion instruction CI2 including the URL 100 stored in the printer 10, to the conversion server 60.

As described above, since the status of printer 10 is the non-error status, the determination result of STEP S14 becomes 'YES', and in STEP S20, the conversion instruction CI1 is transmitted to the conversion server 60. Thereafter, while the conversion server 60 generates the converted print data CD in accordance with the conversion instruction CI1, a problem that the status of printer 10 becomes the error status may occur. For example, when the conversion instruction CI1 is transmitted, when the printer 10 is performing a printing process, an error (such as paper jam) may occur in the printing process. In this situation, until the holding period of the conversion server 60 elapses, the printer 10 may fail to obtain the converted print data CD from the conversion server 60. In this case, in STEP S28 of FIG. 2, the determination result may become 'YES'. Thereafter, when the problem of the printer 10 is resolved, the conversion server 60 regenerates the converted print data CD in accordance with the conversion instruction CI2 of FIG. 4. In this case, since the converted print data CD is supplied from the conversion server 60 to the printer 10, the printer 10 can appropriately perform printing in accordance with the converted print data CD. In this manner, in the present exemplary embodiment, when the holding period of the conversion server 60 elapses, even if the user does not use the terminal device 70 to give a print instruction to the notification server 50 again, the printer 10 automatically transmits the conversion instruction CI2 to the conversion server 60. Therefore, without putting a load on the user, the printer 10 can appropriately obtain the converted print data CD from the conversion server 60, and can appropriately perform printing in accordance with the converted print data CD.

Further, for example, after the holding period of the conversion server 60 elapses (YES in STEP S28 of FIG. 2), when the conversion server 60 regenerates the converted print data CD several times, in STEP S30 of FIG. 2, the determination result may become 'YES'. In this case, since the target print data TD is erased from the storage unit of the notification server 50, the conversion server 60 is unable to obtain the target print data TD from the notification server 50. Therefore, in the case of 'YES' in STEP S30, the printer 10 returns to STEP S10, and stands by, without transmitting any conversion instruction to the conversion server 60, until the user uses the terminal device 70 to give a print instruction to the notification server 50 again (in other words, the printer 10 stands by until the target print data TD is stored in the storage unit of the notification server 50 again).

(Advantages of First Exemplary Embodiment)

When the printer is unable to interpret the target print data, it can be considered a configuration in which the printer obtains the target print data and supplies the target print data to the conversion server (hereinafter, referred to as a comparative example). However, in the comparative example, it is necessary for the printer to perform the acquisition and supply of the target print data, so that the process load of the printer is high. In contrast, in the present exemplary embodiment, when the printer 10 is unable to interpret the target print data TD, the printer 10 transmits the conversion instruction CI1, including the URL 100 and the access token AT, to the conversion server 60, without obtaining the target print data TD. Therefore, the conversion server 60 obtains the target print data TD from the notification server 50 and generates the converted print data CD. Then, the printer 10 can obtain the converted print data CD from the conversion server 60 and perform printing. Therefore, the printer 10 completes printing without obtaining and supplying the target print data TD. In other words, as compared to the comparative example, it is possible to reduce the process load of the printer 10.

Further, in the comparative example, the printer obtains the target print data from the notification server, supplies the target print data to the conversion server, and obtains the converted print data from the conversion server. In other words, in the comparative example, it is necessary to perform communication of a relatively large amount of data (the target print data and the converted print data) three times. In contrast, in the present exemplary embodiment, the conversion server 60 obtains the target print data TD from the notification server 50, and the printer 10 obtains the converted print data CD from the conversion server 60. In other words, the present exemplary embodiment performs communication of a relatively large amount of data two times. Therefore, in the present exemplary embodiment, it is possible to reduce an amount of data communication necessary for printing, as compared to the comparative example. This results in a reduction in the data communication time, and thus it is possible to quickly provide printed matter.

Further, in general, the processing speeds of printers are slower than the processing speeds of servers. Therefore, time required for the printer to obtain the target print data from the notification server may be generally longer than time required for the conversion server to obtain the target print data. Therefore, in the comparative example, time required to obtain the target print data from the notification server is long, and thus the printed matter is provided to the user late. In contrast, in the present exemplary embodiment, the conversion server 60 can quickly obtain the target print data. Even in this respect, in the present exemplary embodiment, it is possible to quickly provide the printed matter to the user. According to the present exemplary embodiment, when the print notification PN1 is received from the notification server 50, the printer 10 can appropriately use the conversion server 60 to perform printing.

Further, in the present exemplary embodiment, when the status of printer 10 is the error status (NO in STEP S14), the printer 10 does not transmit the conversion instruction CI1 to the conversion server 60 until the status of printer 10 changes to the non-error status. When the status of printer 10 changes to the non-error status, the printer 10 transmits the conversion instruction CI1 to the conversion server 60. When a configuration in which the printer 10 transmits the conversion instruction CI1 to the conversion server 60 regardless of the status of printer 10 is used, in a situation where the printer 10 is unable to perform printing, that is, in a situation where the printer 10 is unable to obtain the converted print data CD, the conversion server 60 can generate the converted print data CD. Therefore, before the printer 10 change to the non-error status, an event in which the holding period of the conversion server 60 has elapsed such that the printer 10 is unable to obtain the converted print data CD may occur. In the present exemplary embodiment, after the status of printer 10 changes to the non-error status, the printer 10 transmits the conversion instruction CI1 to the conversion server 60. Therefore, it is possible to suppress the above-described event from being occurred. In other words, according to the present exemplary embodiment, the printer 10 can make the conversion server 60 obtain and convert the target print data TD at an appropriate timing.

The print instruction PH and the print notification PN1 are examples of a 'first print instruction' and a 'first print notification,' respectively. The conversion instruction CI1 and the conversion instruction CI2 are examples of a 'first conversion instruction' and a 'second conversion notification,' respectively. The URL 100 is one example of a 'first target location information' and a 'second target location information.' In other words, in the present exemplary embodiment, the first target location information is the same as the second target location information. The URL 110 is one example of a 'specific location information.' The AT is one example of 'authentication information.' The non-error status and the error status are examples of a 'first status' and a 'second status,' respectively.

Second Exemplary Embodiment

Figure 5:
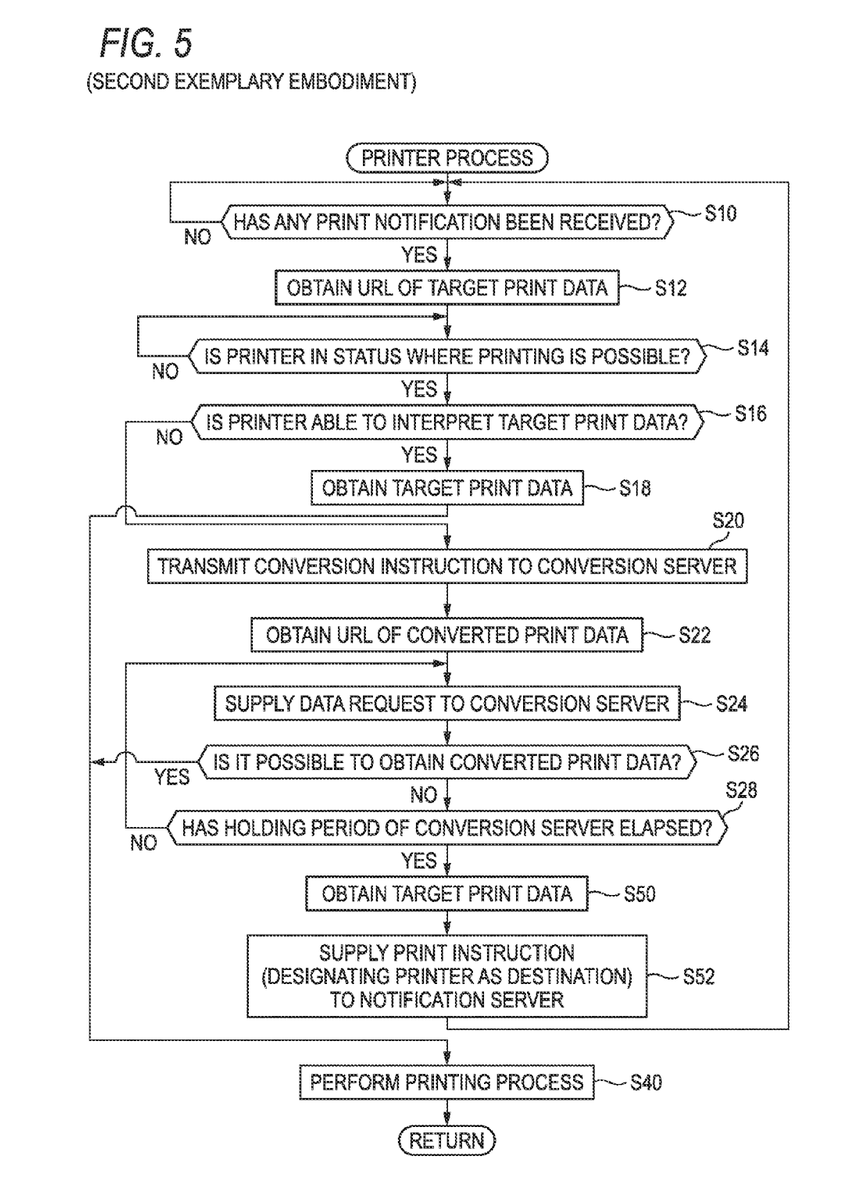
FIG. 5 shows a flow chart illustrating a printer process of a second exemplary embodiment.
Figure 6:
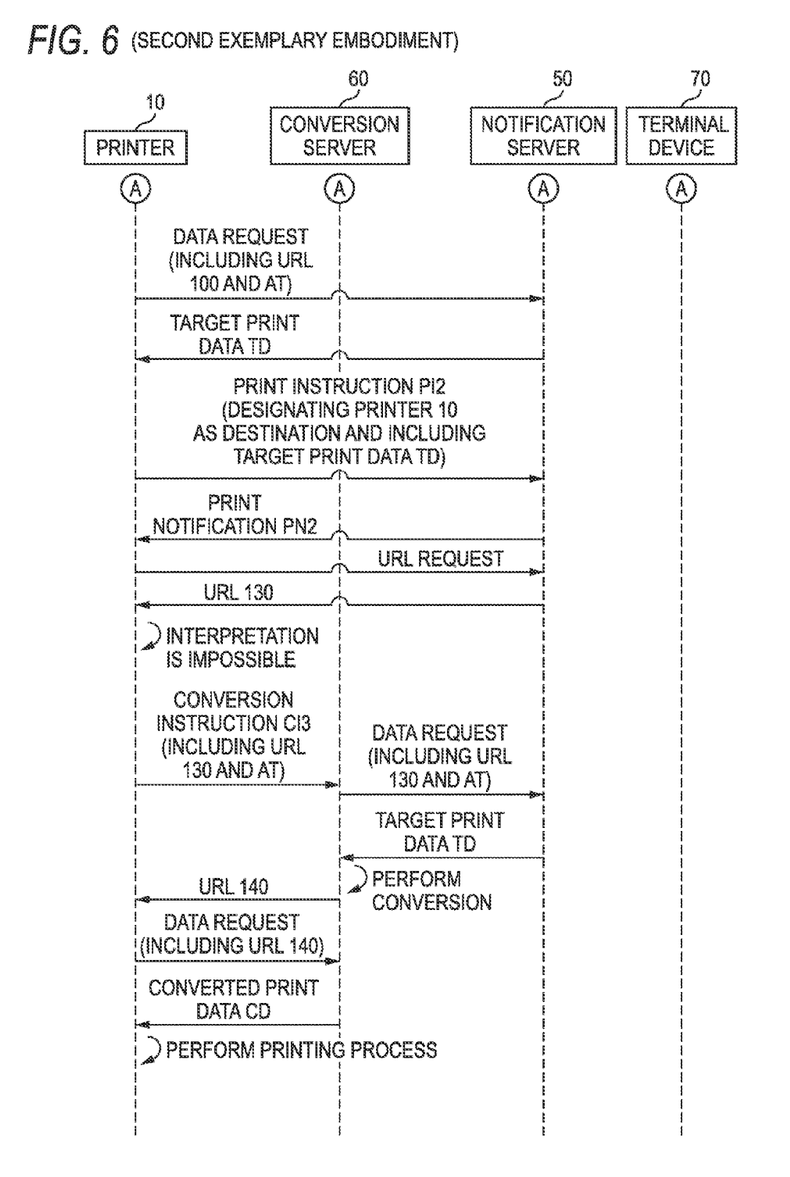
FIG. 6 shows a sequence diagram of processing that is performed by each device according to the second exemplary embodiment.

A second exemplary embodiment will be described with reference to FIGS. 5 and 6. STEPS S10 to S28 of FIG. 5 are the same as STEPS S10 to S28 of FIG. 2. However, in the present exemplary embodiment, in a case of 'NO' in STEP S28, the printer process returns to STEP S24. FIG. 6 shows a sequence of processes to be performed in a case of 'YES' in STEP S28.

In the case of 'YES' in STEP S28, in STEP S50, the print data obtaining unit 34 supplies a data request, including the URL 100 obtained in STEP S12 and the AT stored in the memory 24, to the notification server 50, and obtains the target print data TD from the notification server 50.

Next, in STEP S52, a supply unit 44 (see FIG. 1) supplies a print instruction PI2 (see FIG. 6) including the target print data TD obtained in STEP S50, to the notification server 50. The print instruction PI2 designates the identification information of the printer 10 as the destination for a print notification. In other words, the print instruction PI2 is an instruction for making the notification server 50 transmit a print notification to the printer 10. Incidentally, in a modification, in STEP S50, the print data obtaining unit 34 may not obtain the target print data TD from the notification server 50. In this case, in STEP S52, the supply unit 44 may supply a print instruction PI2 which does not include the target print data TD, to the notification server 50. In the present modification, the print instruction PI2 may include the URL 100 obtained in STEP S12 and may be an instruction for performing printing in accordance with the target print data TD stored in the URL 100.

When the notification server 50 obtains the print instruction PI2 from the printer 10, the notification server 50 stores the target print data TD included in the print instruction PI2, in the storage unit of the notification server 50. Next, in accordance with the identification information of the printer 10 designated as the destination for a print notification in the print instruction PI2, the notification server 50 transmits a print notification PN2 (see FIG. 6) to the printer 10. The print notification PN2 is a notification for making the printer 10 obtain the target print data TD.

In the printer 10, when STEP S52 terminates, the printer process proceeds to STEP S10. In this case, in STEP S10, the receiving unit 30 receives the print notification PN2 from the notification server 50. Next in STEP S12, the first-location-information obtaining unit 38 supplies a URL request to the notification server 50, and obtains a URL 130 (see FIG. 6) of the target print data TD from the notification server 50. This obtained URL 130 is different from the URL 100. The reason is that since the target print data TD is stored in the storage unit of the notification server 50 again, the storage location of the target print data TD in the storage unit changes.

Next, the determination result of STEP S14 becomes 'YES', and the determination result of STEP S16 becomes 'NO'. Then, in STEP S18, the transmitting unit 32 transmits a conversion instruction CI3 (see FIG. 6) including the URL 130 and the AT to the conversion server 60. As a result, the conversion server 60 obtains the target print data TD from the notification server 50 again and regenerates the converted print data CD. Then, the conversion server 60 supplies a URL 140 (see FIG. 6) of the converted print data CD to the printer 10.

In STEP S22, the second-location-information obtaining unit 40 obtains the URL 140 of the converted print data CD from the conversion server 60. This obtained URL 140 is different from the URL 110 of FIG. 3.

Next, in STEP S24, the print data obtaining unit 34 supplies a data request including the URL 140 to the conversion server 60. When the converted print data CD is obtained (YES in STEP S26), in STEP S40, the print control unit 36 makes the print performing unit 16 perform printing in accordance with the converted print data CD.

(Advantages of Second Exemplary Embodiment)

In the above-described first exemplary embodiment, when the holding period of the notification server 50 elapses (YES in STEP S30 of FIG. 2), it is necessary for the user to use the terminal device 70 to give the print instruction to the notification server 50 again. In contrast, according to the second exemplary embodiment, after the holding period of the conversion server 60 elapses (YES in STEP S28), the printer 10 obtains the target print data TD from the notification server 50 in STEP S50, and supplies the print instruction PI2 including the target print data TD to the notification server 50 in STEP S52. As a result, the target print data TD can be stored in the storage unit of the notification server 50 again. Therefore, it is possible to suppress occurrence of an event in which the target print data TD is erased from the storage unit of the notification server 50 before printing is performed. Then, when the printer 10 receives the print notification PN2 from the notification server 50, the printer 10 automatically transmits the conversion instruction CI3 to the conversion server 60. Therefore, without putting a load on the user, the printer 10 can appropriately obtain the converted print data CD from the conversion server 60, and can appropriately perform printing in accordance with the converted print data CD.

The print instruction PI2 and the print notification PN2 are examples of a 'second print instruction' and a 'second print notification,' respectively. The conversion instruction CI3 is one example of the 'second conversion instruction.' The URL 100 and the URL 130 are examples of the 'first target location information' and the 'second target location information,' respectively. In other words, in the second exemplary embodiment, the first target location information is different from the second target location information.

Third Exemplary Embodiment

Figure 7:
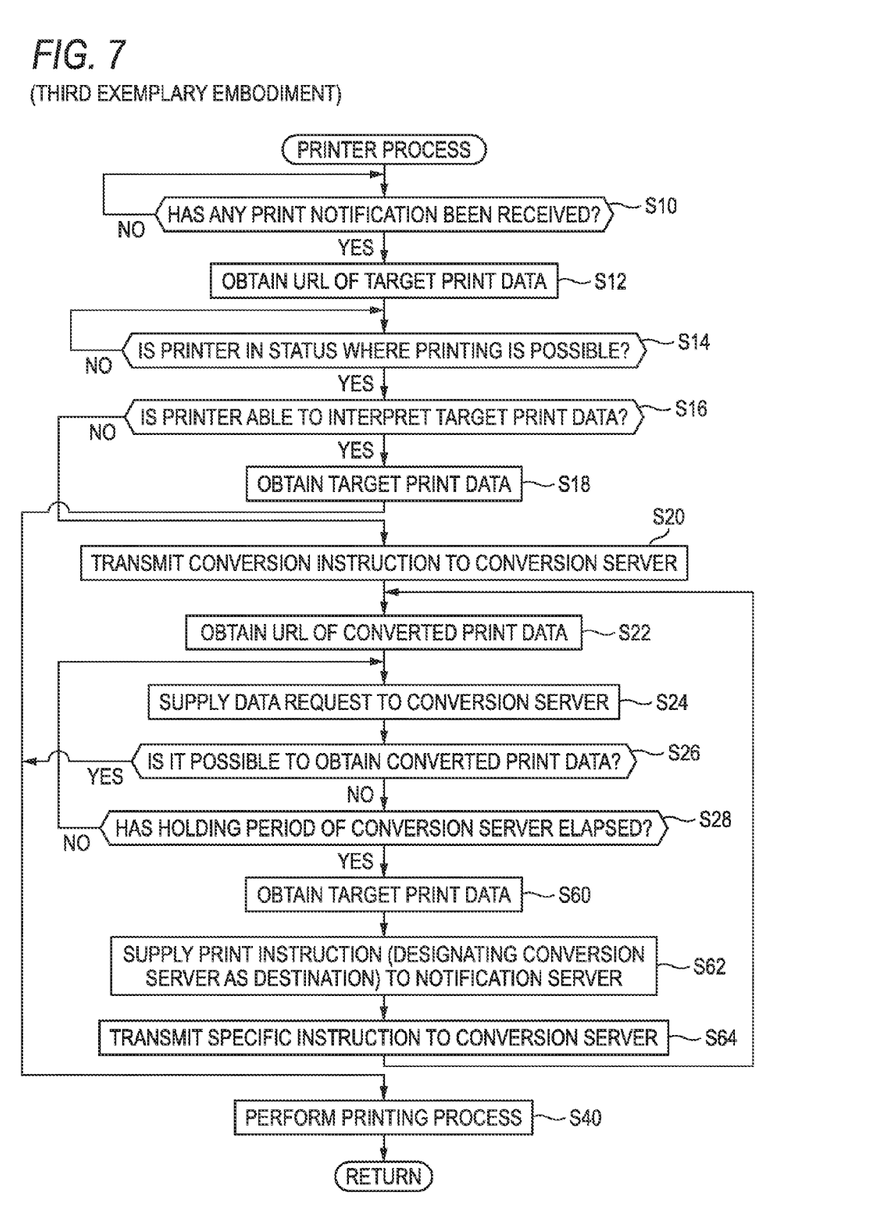
FIG. 7 shows a flow chart illustrating a printer process of a third exemplary embodiment.
Figure 8:
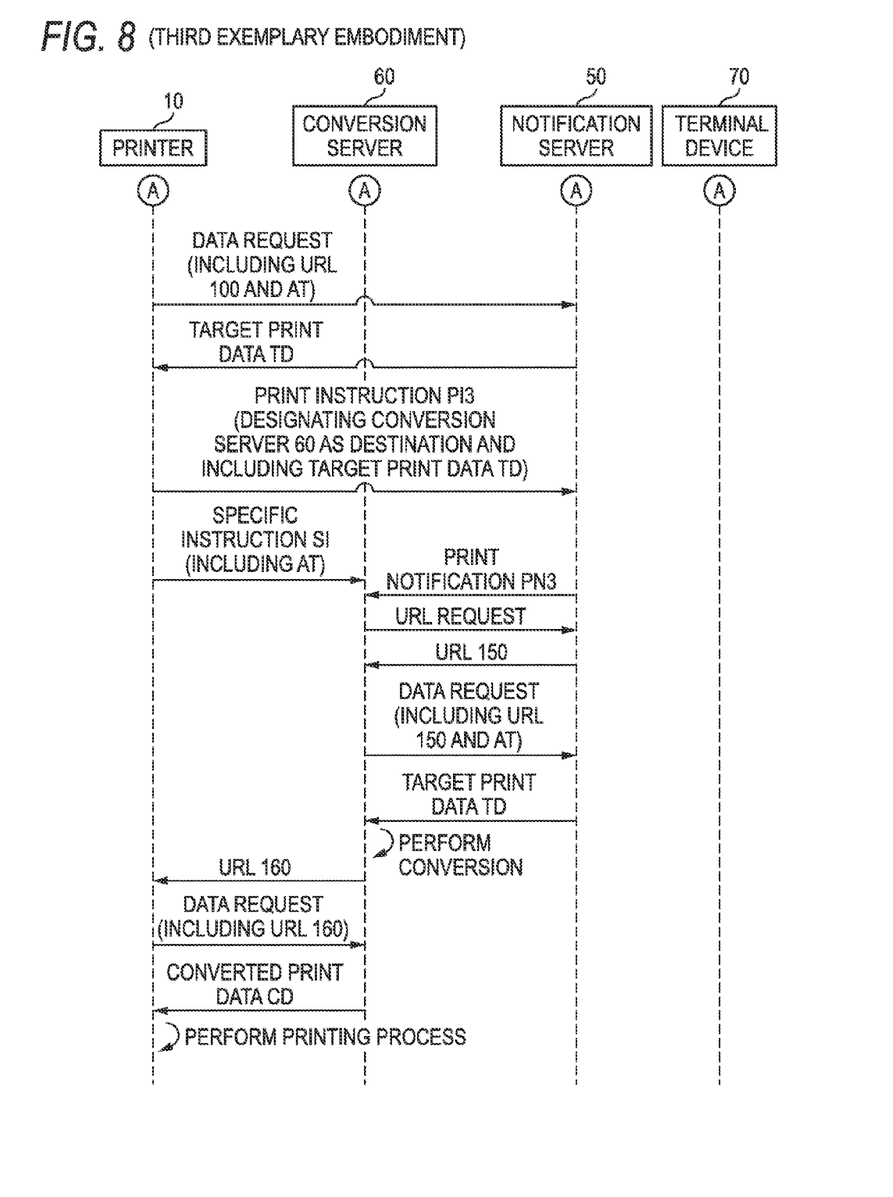
FIG. 8 shows a sequence diagram of processing that is performed by each device according to the third exemplary embodiment.

A third exemplary embodiment will be described with reference to FIGS. 7 and 8. STEPS S10 to S28 of FIG. 7 are the same as STEPS S10 to S28 of FIG. 2. Also, STEP S60 to be performed in the case of 'YES' in STEP S28 is the same as STEP S50 of FIG. 5. FIG. 8 shows a sequence of processes to be performed in the case of 'YES' in STEP S28.

In STEP S62, the supply unit 44 supplies a print instruction PI3 (see FIG. 8) including the target print data TD obtained in STEP S60 to the notification server 50. The print instruction PI3 designates the identification information of the conversion server 60 (for example, the server name of the conversion server 60, the IP address of the conversion server 60, and the like) as the destination for a print notification. In other words, the print instruction PI3 is an instruction for making the notification server 50 transmit a print notification to the conversion server 60.

When the notification server 50 obtains the print instruction PI3 from the printer 10, the notification server 50 stores the target print data TD included in the print instruction PI3, in the storage unit of the notification server 50. Next, in accordance with the identification information of the conversion server 60 designated as the destination for a print notification in the print instruction PI3, the notification server 50 transmits a print notification PN3 (see FIG. 3) to the conversion server 60. The print notification PN3 is a notification for making the conversion server 60 obtain the target print data TD.

In STEP S64, the transmitting unit 32 transmits a specific instruction SI (see FIG. 8) including the AT stored in memory 24 to the conversion server 60. The specific instruction SI is an instruction for making the conversion server 60 convert the target print data TD.

The conversion server 60 receives the print notification PN3 from the notification server 50, and receives the specific instruction SI from the printer 10. In this case, the conversion server 60 first supplies a URL request to the notification server 50, and obtains a URL 150 (see FIG. 8) of the target print data TD from the notification server 50. This obtain URL 150 is different from the URL 100. Next, the conversion server 60 supplies a data request, including the URL 150 and the AT included in the specific instruction SI, to the notification server 50. Therefore, the conversion server 60 obtains the target print data TD from the notification server 50 again, and regenerates the converted print data CD. Then, the conversion server 60 supplies a URL 160 (see FIG. 8) of the converted print data CD to the printer 10.

In the printer 10, when STEP S64 terminates, the printer process proceeds to STEP S22. In this case, in STEP S22, the second-location-information obtaining unit 40 obtains the URL 160 of the converted print data CD from the conversion server 60. This obtain URL 160 is different from the URL 110 of FIG. 3.

Next, in STEP S24, the print data obtaining unit 34 supplies a data request including the URL 160 to the conversion server 60. When the converted print data CD is obtained (YES in STEP S26), in STEP S40, the print control unit 36 makes the print performing unit 16 perform printing in accordance with the converted print data CD.

Even in the third exemplary embodiment, as similar to the second exemplary embodiment, the printer 10 can appropriately obtain the converted print data CD from the conversion server 60, and can appropriately perform printing in accordance with the converted print data CD. Specifically, in the second exemplary embodiment, as shown in FIG. 6, since the printer 10 receives the print notification PN2 from the notification server 50, the printer 10 supplies the URL request to the notification server 50 and obtains the URL 130 of the target print data TD from the notification server 50. In contrast, in the third exemplary embodiment, as shown in FIG. 8, since the conversion server 60 receives the print notification PN3 from the notification server 50, the printer 10 completes printing without obtaining the URL 150 of the target print data TD from the notification server 50. Therefore, it is possible to reduce the process load of the printer 10. Incidentally, in the third exemplary embodiment, the print instruction PI3 and the print notification PN3 are examples of a 'third print instruction' and a 'third print notification,' respectively.

MODIFICATIONS TO EXEMPLARY EMBODIMENTS

Exemplary embodiments of the invention have been described above; however, the embodiments are mealy examples, and do not limit the scope of claims. The technologies described in the scope of claims include various changes and modifications of the exemplified embodiments. Modifications of the embodiments will be exemplified below. Modifications of the above-described embodiments are as follow.

Modified Exemplary Embodiment 1

The 'printer' may not a device having only a printing function, and may be a device having other functions (a scanning function, a copy function, a fax function, a phone function, and the like). That is, the term 'printer' includes a copy machine, a FAX machine, a multi-function device (a device having at least the print function and other functions), and the like.

Modified Exemplary Embodiment 2

In each of the above-described exemplary embodiments, the transmitting unit 32 transmits the conversion instruction CI1 (see FIG. 3) including the URL 100 obtained by the first-location-information obtaining unit 38, to the conversion server 60. Alternatively, the URL 100 may be included in the print notification PN1. In this case, the transmitting unit 32 may specify the URL 100 from the print notification PN1, and transmit a conversion instruction CI1 including the specified URL 100, to the conversion server 60. Generally speaking, the transmitting unit needs only to transmit the first conversion instruction including the first target location information to the conversion server.

Modified Exemplary Embodiment 3

In each of the above-described exemplary embodiments, the print data obtaining unit 34 transmits the data request including the URL 110 to the conversion server 60, so as to obtain the converted print data CD from the conversion server 60. Alternatively, even if the conversion server 60 does not receive the data request from the printer 10, the conversion server 60 may transmit the converted print data CD to the printer 10. In this case, even if the print data obtaining unit 34 does not transmit the data request to the conversion server 60, the print data obtaining unit 34 can obtain the converted print data CD from the conversion server 60. Generally speaking, the print data obtaining unit needs only to obtain the converted print data from the conversion server.

Modified Exemplary Embodiment 4

In each of the above-described exemplary embodiments, when the user of the terminal device 70 registers the account information (the user ID, the password, and the like) in the notification server 50, the notification server 50 generates the AT, and the storage control unit 42 of the printer 10 stores the AT in the memory 24. Alternatively, when the user of the terminal device 70 registers the account information in the notification server 50, the notification server 50 may not generate the AT, and the printer 10 may store the account information in the memory 24. Then, whenever a situation where AT is necessary (for example, a situation where the conversion instruction CI1 is to be transmitted to the conversion server 60) occurs, the storage control unit 42 of the printer 10 may transmit the account information to the notification server 50, and request the notification server 50 to generate an AT. In this case, the storage control unit 42 temporarily stores the AT obtained from the notification server 50 in the memory 24, and the control unit 20 uses the AT stored in the memory 24. Thereafter, the AT may be erased from the memory 24. Generally speaking, the authentication information may be permanently or temporarily stored in the memory of the printer. Incidentally, in each of the above-described exemplary embodiments, the access token is disclosed as an example of the authentication information. However, the authentication information may be other information for obtaining target print data (for example, account information, other kinds of tokens, and the like).

Modified Exemplary Embodiment 5

In each of the above-described exemplary embodiments, the transmitting unit 32 transmits the conversion instruction CI1 including the AT to the conversion server 60. Alternatively, for example, the user may store an AT in the conversion server 60 in advance. In this case, the transmitting unit 32 may transmit a conversion instruction CI1 which does not include the AT, to the conversion server 60. Generally speaking, the transmitting unit needs only to transmit the first conversion instruction including at least the first target location information to the conversion server.

Modified Exemplary Embodiment 6

In each of the above-described exemplary embodiments, when the status of printer 10 is the error status (NO in STEP S14 of FIG. 2), the transmitting unit 32 does not transmit the conversion instruction CI1 to the conversion server 60 until the status of printer 10 changes to the non-error status. Alternatively, the transmitting unit 32 may immediately transmit the conversion instruction CI1 to the conversion server 60, regardless of the status of printer 10 (that is, without performing the determination of STEP S14 of FIG. 2). Generally speaking, the transmitting unit may transmit the first conversion instruction to the conversion server in accordance with or regardless of the status of printer.

Modified Exemplary Embodiment 7

In each of the above-described exemplary embodiments, the CPU 22 of the printer 10 executes software, so as to implement the functions of the respective units 30 to 46. However, at least parts of the respective units 30 to 46 may be implemented by hardware such as logic circuit.

The technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A printer comprising:
 a processor; and
 a memory having a computer program stored thereon that, when executed by the processor, causes the printer to operate as:
   a receiving unit configured to receive a first print notification from a notification server, wherein the first print notification is transmitted from the notification server to the printer when a first print instruction for instructing printing of an image represented by target print data is supplied from a terminal device to the notification server;
   a transmitting unit configured to transmit a first conversion instruction including a first target location information representing a location for specifying the target print data to a conversion server when the first print notification is received from the notification server, wherein the first conversion instruction is for controlling the conversion server to obtain the target print data using the first target location information and to convert the target print data;
   a print data obtaining unit configured to obtain converted print data having a format that can be interpreted by the printer from the conversion server when the conversion server generates the converted print data in accordance with the first conversion instruction; and
a print control unit configured to control a print performing unit to perform printing in accordance with the converted print data;
wherein when a status of the printer is a first status where the printer is able to perform printing, the transmitting unit is configured to transmit the first conversion instruction to the conversion server, and
wherein when the status of the printer is a second status where the printer is unable to perform printing,
the transmitting unit is configured not to transmit the first conversion instruction to the conversion server until the status of printer changes to the first status, and
the transmitting unit is configured to transmit the first conversion instruction to the conversion server after the status of printer changes to the first status.

2. The printer according to claim 1,
wherein the computer program that, when executed by the processor, causes the printer to further operate as:
a first-location-information obtaining unit configured to obtain the first target location information from the notification server when the first print notification is received from the notification server, and
wherein the transmitting unit is configured to transmit the first conversion instruction including the obtained first target location information to the conversion server.

3. The printer according to claim 1,
wherein the computer program that, when executed by the processor, causes the printer to further operate as:
a second-location-information obtaining unit configured to obtain specific location information representing a location for specifying the converted print data from the conversion server, and
wherein the print data obtaining unit is configured to obtain the converted print data from the conversion server using the obtained specific location information.

4. The printer according to claim 1,
wherein the computer program that, when executed by the processor, causes the printer to further operate as:
a storage control unit configured to store authentication information for obtaining the target print data in a storage unit,
wherein when the first print notification is received from the notification server, the transmitting unit is configured to transmit the first conversion instruction including the authentication information stored in the storage unit, to the conversion server, and
wherein the first conversion instruction is for controlling the conversion server to obtain the target print data using the authentication information.

5. The printer according to claim 1,
wherein the computer program that, when executed by the processor, causes the printer to further operate as:
a determining unit configured to determine whether the printer is able to interpret the target print data when the first print notification is received from the notification server,
wherein when the determining unit determines that the printer is unable to interpret the target print data,
the transmitting unit is configured to transmit the first conversion instruction to the conversion server,
the print data obtaining unit is configured to obtain the converted print data from the conversion server, and
the print control unit is configured to control the print performing unit to perform printing in accordance with the converted print data, and
wherein when the determining unit determines that the printer is able to interpret the target print data,
the transmitting unit is configured not to transmit the first conversion instruction to the conversion server,
the print data obtaining unit is configured to obtain the target print data using the first target location information, and
the print control unit is configured to control the print performing unit to perform printing in accordance with the target print data.

6. A printer comprising:
a processor; and
a memory having a computer program stored thereon that, when executed by the processor, causes the printer to operate as:
a receiving unit configured to receive a first print notification from a notification server, wherein the first print notification is transmitted from the notification server to the printer when a first print instruction for instructing printing of an image represented by target print data is supplied from a terminal device to the notification server;
a transmitting unit configured to transmit a first conversion instruction including a first target location information representing a location for specifying the target print data to a conversion server when the first print notification is received from the notification server, wherein the first conversion instruction is for controlling the conversion server to obtain the target print data using the first target location information and to convert the target print data;
a print data obtaining unit configured to obtain converted print data having a format that can be interpreted by the printer from the conversion server when the conversion server generates the converted print data in accordance with the first conversion instruction; and
a print control unit configured to control a print performing unit to perform printing in accordance with the converted print data;
wherein in a specific case where the print data obtaining unit is unable to obtain the converted print data from the conversion server after the first conversion instruction is transmitted to the conversion server, the transmitting unit is configured to transmit a second conversion instruction including second target location information representing a location for specifying the target print data to the conversion server,
wherein the second conversion instruction is for controlling the conversion server to obtain the target print data using the second target location information and to convert the target print data, and
wherein when the conversion server generates the converted print data in accordance with the second conversion instruction,
the print data obtaining unit is configured to obtain the converted print data from the conversion server, and
the print control unit is configured to control the print performing unit to perform printing in accordance with the converted print data.

7. The printer according to claim 6,
wherein the computer program that, when executed by the processor, causes the printer to further operate as:

a supply unit configured to supply a second print instruction for instructing printing of the image represented by the target print data to the notification server in the specific case;

wherein the second print instruction is for controlling the notification server to transmit a second print instruction to the printer;

wherein the receiving unit is configured to receive the second print instruction from the notification server in the specific case; and wherein the transmitting unit is configured to transmit the second conversion instruction including the second target location information to the conversion server when the second print notification is received from the notification server.

8. The printer according to claim 7, wherein in the specific case, the print data obtaining unit is configured to obtain the target print data using the first target location information; and the supply unit is configured to transmit the second print instruction including the target print data to the notification server.

9. A printer comprising:

a processor; and a memory having a computer program stored thereon that, when executed by the processor, causes the printer to operate as:

a receiving unit configured to receive a first print notification from a notification server, wherein the first print notification is transmitted from the notification server to the printer when a first print instruction for instructing printing of an image represented by target print data is supplied from a terminal device to the notification server;

a transmitting unit configured to transmit a first conversion instruction including a first target location information representing a location for specifying the target print data to a conversion server when the first print notification is received from the notification server, wherein the first conversion instruction is for controlling the conversion server to obtain the target print data using the first target location information and to convert the target print data;

a print data obtaining unit configured to obtain converted print data having a format that can be interpreted by the printer from the conversion server when the conversion server generates the converted print data in accordance with the first conversion instruction; and a print control unit configured to control a print performing unit to perform printing in accordance with the converted print data;

wherein the computer program that, when executed by the processor, causes the printer to further operate as:

a supply unit configured to supply a third print instruction for instructing printing of the image represented by the target print data to the notification server in a specific case where it is unable to obtain the converted print data from the conversion server after the first conversion instruction is transmitted to the conversion server, wherein the third print instruction is for controlling the notification server to transmit a third print notification to the conversion server, wherein the third print notification is for controlling the conversion server to obtain the target print data, wherein the transmitting unit is configured to transmit a specific instruction to the conversion server in the specific case, wherein the specific instruction is for controlling the conversion server to convert the target print data, and wherein when the conversion server generates the converted print data in accordance with the specific instruction, the print data obtaining unit is configured to obtain the converted print data from the conversion server, and the print control unit is configured to control the print performing unit to perform printing in accordance with the converted print data.

10. A non-transitory computer-readable storage medium having a computer program stored thereon and readable by a computer of a printer, the computer program, when executed by the computer, causes the computer to perform operations comprising:

a receiving process of receiving a first print notification from a notification server, wherein the first print notification is transmitted from the notification server to the printer when a first print instruction for instructing printing of an image represented by target print data is supplied from a terminal device to the notification server;

a transmitting process of transmitting a first conversion instruction including a first target location information representing a location for specifying the target print data to a conversion server when the first print notification is received from the notification server, wherein the first conversion instruction is for controlling the conversion server to obtain the target print data using the first target location information and convert the target print data;

an obtaining process of obtaining converted print data having a format that can be interpreted by the printer from the conversion server when the conversion server generates the converted print data in accordance with the first conversion instruction; and a print control process of controlling a print performing unit of the printer to perform printing in accordance with the converted print data;

wherein when a status of the printer is a first status where the printer is able to perform printing, the transmitting process transmits the first conversion instruction to the conversion server, and wherein when the status of the printer is a second status where the printer is unable to perform printing, the transmitting process transmits the first conversion instruction to the conversion server until the status of printer changes to the first status, and the transmitting process transmits the first conversion instruction to the conversion server after the status of printer changes to the first status.

* * * * *